(12) United States Patent
Mullen et al.

(10) Patent No.: US 8,082,209 B2
(45) Date of Patent: *Dec. 20, 2011

(54) COMPLIANCE CONTROL IN A CARD BASED PROGRAM

(75) Inventors: Matthew James Mullen, Danville, CA (US); Scott David Spivack, Foster City, CA (US)

(73) Assignee: Visa U.S.A. Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/836,478

(22) Filed: Jul. 14, 2010

(65) Prior Publication Data

US 2010/0318464 A1 Dec. 16, 2010

Related U.S. Application Data

(63) Continuation of application No. 11/690,686, filed on Mar. 23, 2007, now Pat. No. 7,783,564.

(60) Provisional application No. 60/833,455, filed on Jul. 25, 2006.

(51) Int. Cl.
*G06Q 40/00* (2006.01)
(52) U.S. Cl. ........................................................ 705/38
(58) Field of Classification Search .................. 705/26, 705/35, 38–40, 44, 64, 67, 75–78, 304; 707/607, 707/687–690, 694, 758; 235/376, 380, 382
See application file for complete search history.

(56) References Cited

U.S. PATENT DOCUMENTS

| | | | |
|---|---|---|---|
| 5,724,567 A | 3/1998 | Rose et al. | |
| 7,403,922 B1* | 7/2008 | Lewis et al. | 705/38 |
| 2002/0099649 A1* | 7/2002 | Lee et al. | 705/38 |
| 2002/0133721 A1 | 9/2002 | Adjaoute | |
| 2003/0069820 A1 | 4/2003 | Hillmer et al. | |
| 2003/0141362 A1 | 7/2003 | Brown et al. | |
| 2004/0245330 A1 | 12/2004 | Swift et al. | |
| 2004/0249745 A1* | 12/2004 | Baaren | 705/39 |
| 2005/0010483 A1* | 1/2005 | Ling | 705/26 |
| 2007/0038568 A1* | 2/2007 | Greene et al. | 705/50 |
| 2007/0174214 A1 | 7/2007 | Welsh et al. | |
| 2008/0082377 A1 | 4/2008 | Kennis et al. | |

OTHER PUBLICATIONS

Parikh et al., "Purchasing process transformation: restructuring for small purchases", 2005, International Journal of Operations & Production Management, v25n11, pp. 1042-1061.*
International Search Report from International Application No. PCT/US2007/073181 dated Sep. 15, 2008, 1 page.

* cited by examiner

*Primary Examiner* — Mary Cheung
(74) *Attorney, Agent, or Firm* — Kilpatrick Townsend & Stockton LLP

(57) ABSTRACT

An analysis system processes financial transactions data for compliance with a payment program, such that the processing involves receiving data relating to a set of financial transactions that have been authorized by a payment processing system, and determining if one or more of the authorized financial transactions will be subjected to further processing, wherein the further processing operates on the received data and identifies authorized financial transactions that may be out of compliance with transaction rules of the payment program.

21 Claims, 7 Drawing Sheets

COMPLIANCE CONTROL IN A CARD BASED PROGRAM

CROSS-REFERENCE TO RELATED APPLICATIONS

This application is a continuation of U.S. patent application Ser. No. 11/690,686 filed Mar. 23, 2007 entitled "Compliance Control In A Card Based Program" to Matthew Mullen and Scott Spivack, which claims the benefit of U.S. Provisional Application No. 60/833,455 filed Jul. 25, 2006 entitled "Fraud Detection in a Controlled Card Based Program" to Matthew Mullen and Scott Spivack. The contents of each application are incorporated herein by reference in their entirety for all purposes.

BACKGROUND

1. Field of the Invention

The present invention relates to financial transactions conducted with portable consumer devices such as payment cards and smart cards, and more particularly, relates to program management for such financial transactions.

2. Description of the Related Art

The misuse and abuse of transaction payment programs, such as credit card programs that use charge cards, smart cards, debit cards, and other portable consumer devices for payment of financial transactions, affects a wide variety of businesses involved in such transactions. As a result, compliance control is important for businesses involved in card-based payment programs, including merchants, payment acquirers, and issuers. Such payment programs typically subject transactions to a series of validity and authorization checks through online processing before any individual transaction is approved. A variety of special codes, encryption keys, and the like are often used to ensure that only valid cards are presented to a merchant. These safeguards are directed to prevent fraud, but are not of great advantage in managing payment programs to prevent misuse and abuse.

Misuse and abuse can occur on transactions with valid cards where the transaction itself may not be in compliance with payment program regulations for use. For example, a transaction may be for purchase of inappropriate or disallowed charges, or a transaction may exceed a user's authorized transaction limit, though the transaction might otherwise be valid. Such misuse and abuse of authorized cards continues to be a problem. As a result, businesses continue to suffer significant losses due to activity that constitutes misuse or abuse of authorized cards.

Non-compliant use of issued cards is such a significant problem that the U.S. government has mandated internal controls for government agencies with respect to government charge card payment programs administered by the agencies. Such charge card payment programs include programs for purchase card accounts and for travel card accounts. As a result, card issuers who wish to provide processing for financial transactions and participate in government-sponsored card-based purchasing programs must be mindful of such regulations. The internal controls necessary for such government-issued cards are described in Circular A-123 from the U.S. Government Office of Management and Budget (OMB) relating to the federal controlled-card program. Appendix B (revised February 2006) of the Circular A-123 publication is entitled "Improving the Management of Government Charge Card Program" and is directed to ensuring effective controls to mitigate the risk of abuse, misuse, and delinquency in such card accounts. Training, performance metrics, and data reporting are components of the program. Thus, concern over non-compliant use of payment cards extends from commercial enterprises to government agencies.

It should be apparent from the discussion above that here is a need for payment transaction processing that helps reduce the incidence of misuse and abuse in financial transaction payment programs that involve purchase cards, portable consumer devices, and the like. Embodiments of the present invention satisfy this need.

SUMMARY

Embodiments of the present invention enable processing financial transactions data for compliance with a payment program, such that the processing involves receiving data relating to a set of financial transactions that have been authorized by a payment processing system, and determining if one or more of the authorized financial transactions will be subjected to further processing, wherein the further processing operates on the received data and identifies authorized financial transactions that may be out of compliance with transaction regulations of the payment program. In another aspect, the further processing can comprise processing the received data with a set of predetermined business rules and identifying financial transactions as a passed transaction that is in compliance with the transaction regulations, or as a flagged transaction that is to be checked for violation of one or more of the transaction regulations. In the context of the present discussion, a "passed transaction" comprises a transaction that has not been flagged as violating a transaction regulation. The financial transaction, if it is identified as a passed transaction, can be further processed to determine if the passed transaction includes transaction characteristics that indicate a likely non-compliant transaction. Thus, even passed transactions that are authorized can be subject to further processing. In this way, the invention helps to reduce the incidence of misuse and abuse in financial transaction payment programs that involve purchase cards, portable consumer devices, and the like.

In yet another aspect, the further processing can comprise performing sampling on passed transactions to designate one or more of the passed transactions as flagged transactions to be checked for violation of one or more of the transaction regulations. In another aspect, the further processing can comprise performing prediction processing on the passed transactions to identify transaction characteristics that comprise rules avoidance behavior indicating a likely non-compliant transaction. In another aspect, a convenient user interface can be provided so that user input can be received over a network, the user can be determined to be authorized, and the operation of the further processing can be adjusted in accordance with the user input. In particular, the processing of passed transactions can be changed in this way.

A system constructed in accordance with the invention can include components to perform the financial transaction processing such that the sampling and prediction processing can occur for the passed transactions. Such components can be maintained by card issuers for operation during financial transaction processing to mitigate the incidence of non-compliant transaction practices.

Other features and advantages of the present invention should be apparent from the following description of exemplary embodiments, which illustrate, by way of example, aspects of the invention.

DETAILED DESCRIPTION

Figure 1:
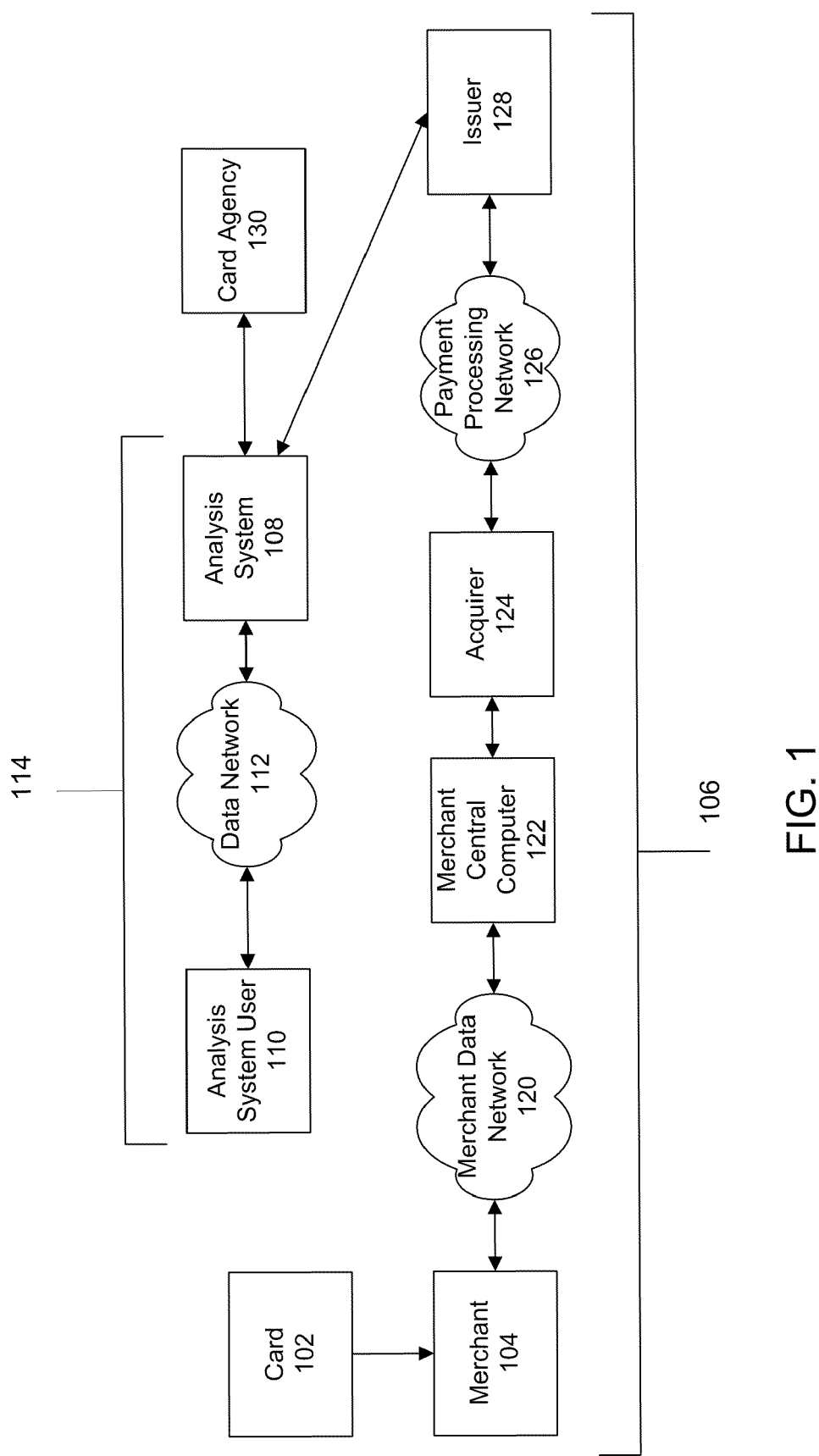
FIG. 1 is a high-level functional block diagram depiction of a processing system constructed in accordance with the present invention.

A high level functional diagram of a transaction processing system 100 constructed in accordance with the present invention is shown in FIG. 1. In the system 100, a card 102 (or other portable consumer device) is used in a financial transaction, such as by being presented to a merchant 104 for the payment of goods or services. The presentation of the card 104 may comprise the card being read by a processing reader at the merchant, or the cardholder providing the card number to a merchant via a telephone order, or entering the card number and associated information over a network data connection. Once the card information is entered, the payment process for the associated financial transaction is initiated and the transaction data proceeds through a payment processing system 106 that will be familiar to those skilled in the art.

The payment processing system 100 includes authorization and verification processing for payment through the account of the cardholder. In the FIG. 1 system 100, data relating to the financial transaction is received at an analysis system 108 constructed in accordance with the invention. The analysis system 108 permits system users 110 to access the received data over a secure network 112 and perform various data management, report generation, and system administration functions, thereby comprising a transaction analysis network 114 that can help mitigate non-compliant transactions in the payment processing system 106.

Those skilled in the art will appreciate that the payment processing system 106 operates to receive financial transactions at a merchant 104 and provide the transactions over a merchant data network 120 to a merchant central computer 122 for further processing. At the merchant central computer, the financial transactions for the merchant are transmitted to a card processing payment acquirer 124 and are then transmitted over a payment processing network 126 to the card issuer 128. It should be noted that, although specific components are shown in FIG. 1, systems according to embodiments of the invention may include more or less components than are shown in FIG. 1. For example, although two separate blocks are shown for the acquirer 124 and issuer 128, it should be understood that a single organization may act as both an issuer and an acquirer in some cases. In FIG. 1, all of the connecting lines indicate data communications between components. All data communications occur over secure links.

The data for a transaction 104 may be received into the analysis system 108 after payment authorization and settlement with the issuer 128 has already taken place. The transaction data generally includes card number and account holder data such as address, balance, and authorized spending limit, as well as transaction data such as account balance, merchant name and address, charge date, payment amount, and the like. FIG. 1 shows that the analysis system 108 can receive transaction data directly from a card agency 130. The card agency comprises a sponsoring organization or other entity that is involved in management of the account for the card 102 and that authorizes use of the analysis system 108 for account management and prevention of non-compliant use. Thus, if the card is provided by an employer or a government agency, then that employer or agency comprises the card agency 130 that authorizes and manages use of the analysis system 108 through system users 110. The system users can access the analysis system 108 over a secure network connection 112, such as an "https" Internet connection via a Web browser. The Web access permits relatively convenient access to users for account management and administration. The users 110 will generally be employees of the card agency 130 who have been granted access privileges, but can include any other persons granted access by the agency, as described further below.

FIG. 1 shows that the analysis system 108 also can receive transaction data directly from the issuer 128, as indicated by the connecting link in FIG. 1. The analysis system can also receive financial transaction data over a network connection 112, such as over a secure Internet connection via https protocol. That is, transaction data can be received over an otherwise public network such as the Internet, so long as the connection is a secure connection between the sender and receiver.

The card 102 may alternatively be a portable consumer device in any suitable form for entering the transaction data into the system 106. For example, in addition to comprising a conventional credit card, the portable consumer device can comprise a hand-held device that can fit into a consumer's wallet and/or pocket (e.g., a pocket-sized device). Such portable consumer devices may include smart cards, conventional credit or debit cards (with a magnetic strip and without a microprocessor), a token or keychain device (such as the Speedpass™ device commercially available from Exxon-Mobil Corp.), and the like. Other examples of suitable portable consumer devices include consumer electronic devices such as cellular phones, personal digital assistants (PDAs), pagers, and the like. Other examples of portable consumer devices 102 include payment cards, security cards, access cards, smart media, transponders, and the like, so long as account holder information and transaction data can be entered into the processing system 106.

Figure 2:
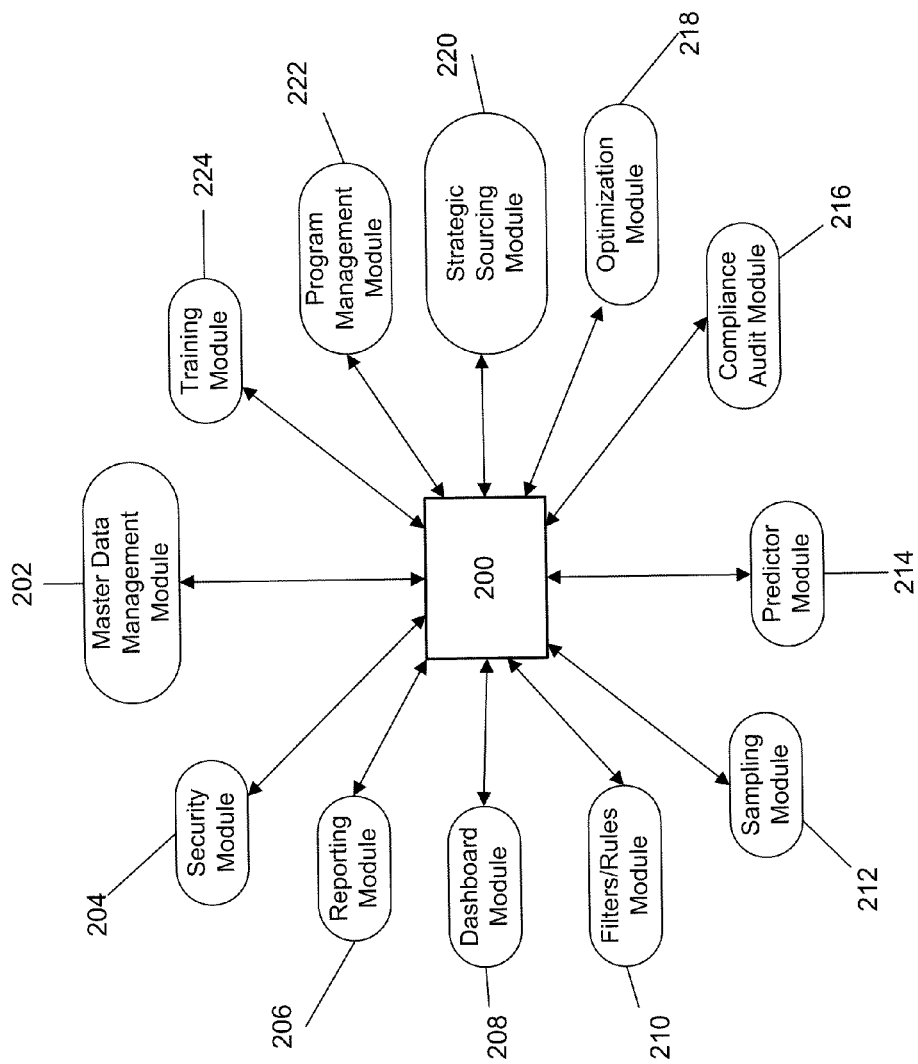
FIG. 2 is a block diagram of the components comprising the analysis system illustrated in FIG. 1.

The analysis system 108 can be Web-based, comprising a Web server computer that executes program modules that perform the operations described herein. The program modules comprise computer software applications that are installed and are executed on a computer processor such as the Web server computer. As noted above, the Web server computer of the system 108 can be accessed over a secure Internet connection 112 by authorized users 110. FIG. 2 shows the modules that execute on the Web server computer in one embodiment constructed according to the present invention. In the discussion herein, references to "the application" will be understood to refer to the analysis system 108, or to one or more components thereof.

The system of FIG. 1 receives data relating to a financial transaction that has received payment authorization by the payment processing system 106 and identifies the financial transaction as a flagged transaction that is to be checked for violation of one or more transaction filtering schemes or business rules, or as a passed transaction. A passed transaction comprises a financial transaction that has been checked for a filter and/or rules violation that indicates likely non-compliant (misuse or abuse) activity. That is, payment authorization of a transaction presupposes that the transaction does not comprise an outright violation of the program transaction regulations, whereas a passed transaction is an authorized transaction that has "passed" initial scrutiny for violation of the program regulations, whereas a "flagged" transaction comprises an authorized transaction that has been designated for further review. The system determines if an authorized transaction shall be subjected to further processing, wherein such further processing is for the purpose of identifying transaction characteristics that indicate a likely non-compliant (misuse or abuse) transaction. Typically, processing for violations of filter parameters or business rules are automatically a part of the further processing. As described further below, the further processing can include sampling processing to identify transactions for additional scrutiny independently of any characteristics related to the transaction itself. Alternatively as described further below, the further processing can comprise predictor processing in which transaction characteristics of a passed transaction are examined to identify features that indicate likely non-compliant activity.

FIG. 2 shows twelve modules comprising an embodiment of an analysis system 200 constructed in accordance with the invention. The system is depicted in FIG. 2, for purposes of illustration, as twelve modules arrayed around the analysis system 200 in the center. It should be understood that the analysis system can interoperate with other computer systems, such that it is not necessary for the analysis system to perform the functions of all twelve modules. That is, one or more of the twelve modules can be installed on other computers that are not located at the same network node (and do not share operational memory with) the analysis system Web server computer 108 (FIG. 1). Any computer system or Web server with any one of the modules installed and executing will be referred to as a "processor" of the associated module type. Thus, a computer system with a program management module installed at the system may be referred to herein as a "program management processor", and references to "module" and "processor" shall be used interchangeably to refer to the computer system with associated module software installed and executing.

The twelve modules illustrated in FIG. 2 include: a master data management module 202; a security module 204; a reporting module 206; a dashboard module 208; a filter/rules module 210; a sampling module 212; a predictor module 214; a compliance audit module 216; an optimization module 218; a strategic sourcing module 220; a program management module 222; and a training module 224. The master data management module 202 and the security module 204 ensure appropriate data security and program administration and management capabilities. Any of the foregoing modules (or corresponding processors) may be combined in any suitable manner. For example, one embodiment of the invention may include the combination of the filter/rules module, the sampling module, and the predictor module, with or without any of the other modules, in a computer system for operation in accordance with the invention.

The analysis system shown in FIG. 2 provides a processing path for financial transactions in addition to processing through the payment processing system 106 (see FIG. 1). In accordance with the invention, the analysis system processing involves filter/rules processing that receives authorized transactions (after settlement) that have been approved (and therefore are not known to have violated any regulation of the card program). Such transactions will be referred to as authorized or settled transactions. The filter/rules processing then identifies a subset of the authorized transactions that are suspected to involve non-compliant activity that would constitute misuse or abuse. Such identified transactions will be referred to as "flagged" transactions. The remainder of the authorized transactions comprise "passed" transactions that have not been identified by a filter or rule as being a non-compliant transaction. The analysis system processing then involves identifying a group from the passed transactions that will be subjected to further processing for potentially non-compliant activity. The further processing can involve sampling by the sampling module 212 or prediction processing by the prediction module 214, or both. All twelve modules will be described in greater detail below.

Master Data Management Module

The master data management module 202 houses all data for the application. It can manage the process for the importing and exporting of application data. This module will communicate with all twelve of the modules shown in FIG. 2 by providing the intersection of data sharing and exchange. The master data management module 202 will coordinate and facilitate the interaction with all of the potential data sources. FIG. 1 shows some of the likely data sources. The sources are not all-inclusive and additional sources can be included, such as a wide variety of external systems, in accordance with security compatibilities and initiatives of the analysis system users. The master data management module 202 will also help manage the sharing of data between independent applications (e.g., agency electronic access system, bank electronic access system, issuer databases such as merchant profile data, ERP (enterprise resource planning) systems, and the like).

Thus, the master data management module 202 can provide the following functions. The module can manage all application data. The module can also provide storage and schema for all application tables and data elements. This can involve providing ETL (extract, transform and load) functions to manage the processes that move data from the multiple sources, reformat and cleanse (e.g., virus check) the data and load it into another database, a data mart or a data warehouse for analysis, or on another operational system to support a business process. The module can maintain merchant profiles, which involves storing data about each merchant compiled from multiple data sources. It can determine how to match a merchant from different sources without a common key, which is desirable to avoid duplicate entries. The module can also manage application import and export functionality. Such management can involve the ability to accept data elements from an external data source (e.g., text file, database) and the ability to provide data exports that can be integrated into an organization's Enterprise Resource Planning, general ledger, or other back-office applications. The module can also provide a data mapping tool, having the functionality to create a relationship in a new dataset and associate it with an established field in the application (e.g., a data source may label the "merchant name" field "vendor short name"). This functionality can be similar to a Microsoft Access™ import data process. Examples of potential data sources are illustrated in FIG. 1 and may include the card agency 130 and entities within the payment processing system 106.

The sequence of operations in which this module can be used includes the sequence of operations as follows in Table 1:

TABLE 1

Module Use Case:

1. Log in to the application through portal front end.
2. View links to entitled modules.
3. Select master data management module.
4. Agency administrator user can select any of the following options within the master data management module.
4.1. Review, edit, and modify data mapping relationships (e.g., Microsoft SQL database view).
4.2. Monitor and manage the databases and associated maintenance services within the application.
4.3. Select incoming data source and relate data elements to the application data elements for import of data (e.g., "vendor" in the incoming data file is the same as "merchant" in the application. This relationship would be created so the "vendor" data would import into the application in the "merchant" field).
4.4. Define, create, and execute data import or export files (e.g., export a data file to be interfaced with a local financial application to avoid re-keying of data).
4.5. Receive email confirmation that extract or upload has successfully occurred. If there are errors in the extract or upload, the error messages can be included in an email.
5. User closes module.

Security Module

The security module 204 manages overall application security and provides each user with his or her specific application entitlement rights. This module can serve as the cornerstone for ensuring the security of data for each agency and user. Security rights can be driven using the application hierarchy structure for each agency. Rights can be set to allow only authorized users to view their entitled card program data. For example, one Federal program will not be able to see another Federal program data and a user/cardholder within an agency will not be able to view another user/cardholder's transaction information. The application can also be designed to meet pertinent cardholder information security compliance requirements.

The analysis system functionality can provide several role assignment options for users. The user roles and a brief description of their anticipated entitlement include the following users. First, an administrator may be an individual who may be a "super" user that has no restrictions within the application, who can add, edit, modify, delete throughout the application and who can view all hierarchy nodes within the application and drill down to a transaction detail level. Another user is a typical analysis system user. The system user can have restricted access within the application and can view entitled hierarchy nodes within the application and drill down to a transaction detail level. Another user is an agency administrator. The agency administrator may be an agency specific user, typically at the program management office level, entitled to no restrictions within a specific agency hierarchy point, who can add, edit, modify, or delete information throughout the application, but is restricted to entitled hierarchy nodes. An agency user may be a user who is a user entitled to restricted access within a specific agency hierarchy point, such as an agency program coordinator, approving official, or cardholder. Another user is referred to as an analysis system auditor user, who is entitled with view-only rights within the application. This role is intended, for example, in connection with users at the U.S. federal government perspective, involving the GSA (Government Services Administration), GAO (Government Accounting Office), IG (Inspector General), and the like. The analysis system auditor also can view all hierarchy nodes within the application and drill down to a transaction detail level. Lastly, an agency auditor user is a user who is entitled with view only rights within a specific agency hierarchy point.

Thus, the security module 204 can provide the functions of managing overall application security, maintaining user profiles, and managing the program hierarchy. In managing security, the module can prevent an agency from determining if any other agency is using the application, thereby maintaining confidentiality. In managing user profiles, the module can help users create and manage user profiles, manage user entitlement rights, and can automate forgotten password processing. Managing the program hierarchy will involve creating and managing program hierarchy point profiles and managing program entitlement rights.

Exemplary operations associated with this module are shown in Table 2 below:

TABLE 2

Module Use Case:

1. Log in to the application through portal front end.
2. View links to entitled modules.
3. Select security module.
4. Agency administrator user can select any one of the following options within the security module.
4.1. Manage overall application security by establishing the application hierarchy. A user can create and manage program hierarchy point profiles along with their associated program entitlement rights. The ability to make these changes would be restricted to the agency level. Create a profile for a user by completing the required fields.
4.2. Assign a user entitlement rights that allow a specific user to view and use the application modules.
4.3. Assign a user entitlement rights that allow a specific user to view, edit, add, and/or delete within his or her hierarchy point.
4.4. Manage the automated "forgotten password" process specifics and reset passwords manually as desired.
5. User closes module.

Reporting Module

The reporting module 206 manages all reporting for the application. It provides standards reports, ad-hoc report generation capabilities and custom alert functionality. The custom alerts can be tailored to meet specific user needs by sending a user an email message when a predetermined set of criteria has been matched by a transaction.

Each card program can face many challenges around reporting. The application is designed to assist agencies in fulfilling their reporting requirements. For example, the application can contain standard reports that are designed to meet Federal reporting requirements like small, minority-owned, and women-owned businesses, 1099-MISC (service payments) and 1057 (monthly summary of contracting action) reporting requirements.

The reporting module 206 can provide online access to transaction data through scalable report formats, queries, and data export methods. Thus, administrators, managers, and cardholders can be granted access to numerous reports in a variety of formats, including standard and processor-generated, as well as database queries. Report availability can be restricted by user profile entitlement rights. The module can also provide standard reports, including standard reports where the user can indicate specific criteria (e.g., date range, dollar amounts, etc.) of transactions to be included in the report. The module can also provide full ad-hoc reporting capabilities with point and click selection of data elements to be included in the report and can allow the user to design, develop and run a report containing any of the application data elements.

The reporting module can also provide an alert system, having the ability to send email alerts based on any system-wide criteria (e.g., transactions greater than $50,000), sending an email alert to the user as requested by the user in the setup process. The reporting module can also provide report scheduling, wherein reports will use a pull management strategy prompting users to login to the application and initiate the viewing or downloading of reports. Reports can be provided in a variety of formats, such as PDF, Excel, Word, and CSV (comma separated value) document formats. The reporting module allows users to schedule the running of a report(s) and deliver an email message upon completion with a link to login into the application and download the report.

Exemplary operations associated with this module include the following operations in Table 3 below:

TABLE 3

Module Use Case:

| | |
|---|---|
| 1. | Login. |
| 2. | View menu with available list of standard reports and ad-hoc reports. |
| 3. | Agency administrator user can performs any one of the following options within the reporting module. |
| 3.1. | Standard reports. |
| 3.1.1. | User views a list of the application standard reports. |
| 3.1.2. | User can modify certain parameters (e.g. date, etc.) before running a report. |
| 3.1.3. | Report is generated. |
| 3.1.4. | Report can be printed, or emailed. |
| 3.2. | Customized reports. |
| 3.2.1. | User views a list of their customized "saved" reports. |
| 3.2.2. | User can modify certain parameters (e.g. date, etc.) before running a report. |
| 3.2.3. | Report is generated. |
| 3.2.4. | Report can be saved, printed, or emailed. |
| 3.3. | Ad-hoc reports. |
| 3.3.1. | User views a list design options for creating a customized report. |
| 3.3.2. | User can modify available parameters and include any data elements before running a report. |
| 3.3.3. | Report is generated. |
| 3.3.4. | Report can be saved, printed, or emailed. |
| 3.4. | Setup email alert system. |
| 3.4.1. | Establish limits for activating a specific alert. |
| 3.4.2. | Determine recipient list. |
| 4. | User closes module. |

Dashboard Module

The dashboard module provides a quick view of key operational metrics. The user can determine which metrics to display and how they would like to have the information displayed. For each agency card program, data reporting is a desirable tool for improving charge card management. Charge card managers and other stakeholders need timely and accurate data to assess compliance with legislative and administrative requirements, the effectiveness of efforts to mitigate risks of misuse, waste, and abuse and the performance trends in managing costs and other relevant indicators of program success. One feature of the application is to facilitate and standardize each of the agency reporting requirements.

The dashboard module can provide the functionality of displaying a program dashboard through which users can achieve online access to transaction data through scalable report formats, queries, and data export methods. Through the dashboard module, users can view key program metrics, charts, graphs, and other visual presentations of information, drill-down to view core data details, set "red-yellow-green" flags criteria, and request report generation for management reports.

Exemplary operations associated with this module are shown below in Table 4:

TABLE 4

Module Use Case:

| | |
|---|---|
| 1. | Log in to the application through portal front end. |
| 2. | View links to entitled modules. |
| 3. | Select dashboard module. |
| 4. | Agency administrator user will see their customized dashboard view displaying the key operating metrics that are pertinent to the user. |
| 5. | Agency administrator user can perform any one of the following options within the dashboard module. |
| 5.1. | Setup a user specific default view. |
| 5.2. | View all available key operating metrics and select which metrics to view on their dashboard. |
| 5.3. | Select the visual display format of the metrics (e.g., table, chart, graphical, etc.). |
| 5.4. | Set upper and lower limit flags for the user. This will determine the "red, yellow, and green" regions of the displays. |
| 5.5. | On the user customized dashboard, the user can drill down into dashboard, charts and reports by clicking on the displayed data. |
| 5.6. | Run and modify management reports. Modification ability can be limited to simple changes (e.g., date range, hierarchy point, etc.). |
| 6. | User closes module. |

Filters/Rules Module

The filters/rules module manages all the business rules for flagging transactions. It can provide users with industry standard rules along with the capability to create and customize filters/rules specific to their needs. That is, the business rules are independent of the card program regulations, which are not known to have been violated by authorized transactions. Rather, the business rules comprise rules the violation of which may tend to indicate misuse or abuse activity.

Business rules are agency determined criteria used to compare against a transaction criteria in order to determine if there is a match. If a match occurs, then a transaction is deemed to require further processing and is "flagged" for further investigation. A set of default business rules and filter settings may be provided, and a module interface is provided to enable authorized users to create business rules and filter settings of their own. Common business rules used in public sector card programs will typically be included in the application default business rules, which may include the following: government "banned merchant" list, suspect merchant list, blocked/restricted MCC (merchant category code) list, suspect MCC list, new merchant rule, exceeding transaction dollar limit rule, velocity transaction rule, split purchase rule, activity on closed accounts rule, forced transactions rule, disputed transactions rule and weekend or holiday transactions rule.

Each agency can select a customized set of business rules to apply to their transactions. Agencies can use the module to modify any of the default business rules or create their own customized rules. Each rule applied by this module will also have the ability to be assigned to an alert. The alert can notify a designated user via email that a specific business rule criteria has been matched within a transaction. This functionality could prove useful in alerting program management offices of any high-value transactions that are processed using their cards.

The filters/rules module can provide the functionality of flagging transactions for review based upon criteria established by the program administrator. The module can contain a list of rules. Specific rules may be chosen by the user for inclusion in a specific process. Each entitled user can view the rules based on his or her specific hierarchy point. Each rule may be configured to the specific attributes of the program or according to the discretion of the program administrator. The filter/rules module process can be initiated by the user on a scheduled basis (e.g., daily, weekly, monthly, etc.) or as needed. The filter/rules module can be applied over any user defined historical or aggregated period of transactions by account or agency (e.g., view a rule applied to transactions within a single day, week, month, year, etc.) to better understand the true business impact of the rule. The filter/rules module can also provide timely feedback on transactions, which can allow an agency to initiate a dispute process within the 60-day dispute period if it wants to do so. The module can integrate with the compliance and audit module 216.

The analysis system provides a user interface, such as a rules criteria display screen, through which authorized users can specify the set of rules to be used for processing, as well as create user-defined rules. In addition, users can schedule execution of the rules to be applied. Users can define their own rules by specifying a field name, a comparison expression, a test value, and a joining operand. The field names relate to the financial transactions, and include data such as: account balance parameters (closing date, balance due, last payment, past due, previous balance, and the like); card account type; cardholder information (name, address, spending limit); transaction information (billing amount, merchant category, merchant name, address, transaction type). The comparison expression will include operators such as equal, greater than, less than, and the like. The test value will be particular values for match testing by the rule, such as "first name=Robert" or "last name=Smith", where the test value would be "Robert" or "Smith", respectively. The test values can be single values, such as "Smith", or can be a list of values, such as "Smith, Smithy, Smithson". The joining operator will be an operand to link rules together into a compound rule, such as the AND operator and the OR operator. When a user creates a rule, the user can give the rule a name, for more convenient specification at another time. Rules can be scheduled to be executed (run) at predetermined times, such as run once immediately or at a particular day and time, or run daily, weekly, or monthly, according to an initial day and time.

The output of a filter/rule execution will comprise a list or group of financial transactions that are identified as matching the specification of the rule. The output can be saved to a file or database for later examination. Part of the filter/rule execution is the ability to flag identified matches (i.e., transactions) for further review. Such further review, for example, can be performed by the compliance/audit module, or can be performed by review from a user. The analysis system provides a user interface (display screen) that permits users to review the rules output and to flag particular transactions for further review.

In another aspect of the analysis system, a program manager can create a rule and can specify an environment to test the rule. That is, the rule specification and test feature permits an authorized person such as a program manager to define a rule and create a set of test data (or designate a copy of actual data) that will be subjected to processing by the rule. The module will collect output from the operation of the test rule so that the authorized person can evaluate the results of applying the rule.

Exemplary operations associated with this module are listed in Table 5 below:

TABLE 5

Module Use Case:

1. Log in to the application through portal front end.
2. View links to entitled modules.

TABLE 5-continued

Module Use Case:

3. Select filters/rules module.
4. Agency administrator user can select any one of the following options within the filters/rules module.
4.1. Select to activate or de-activate any of the application provided filters.
4.2. Modify setting for any of the application provided filters.
4.3. Create, edit and delete custom agency specific filters.
4.4. Run filter scenario reports to asses the impact of filter modifications on results.
4.5. Select the frequency to run the rules/alerts and generate results (e.g., daily, weekly, monthly, etc.).
5. User closes module.

Figure 3:
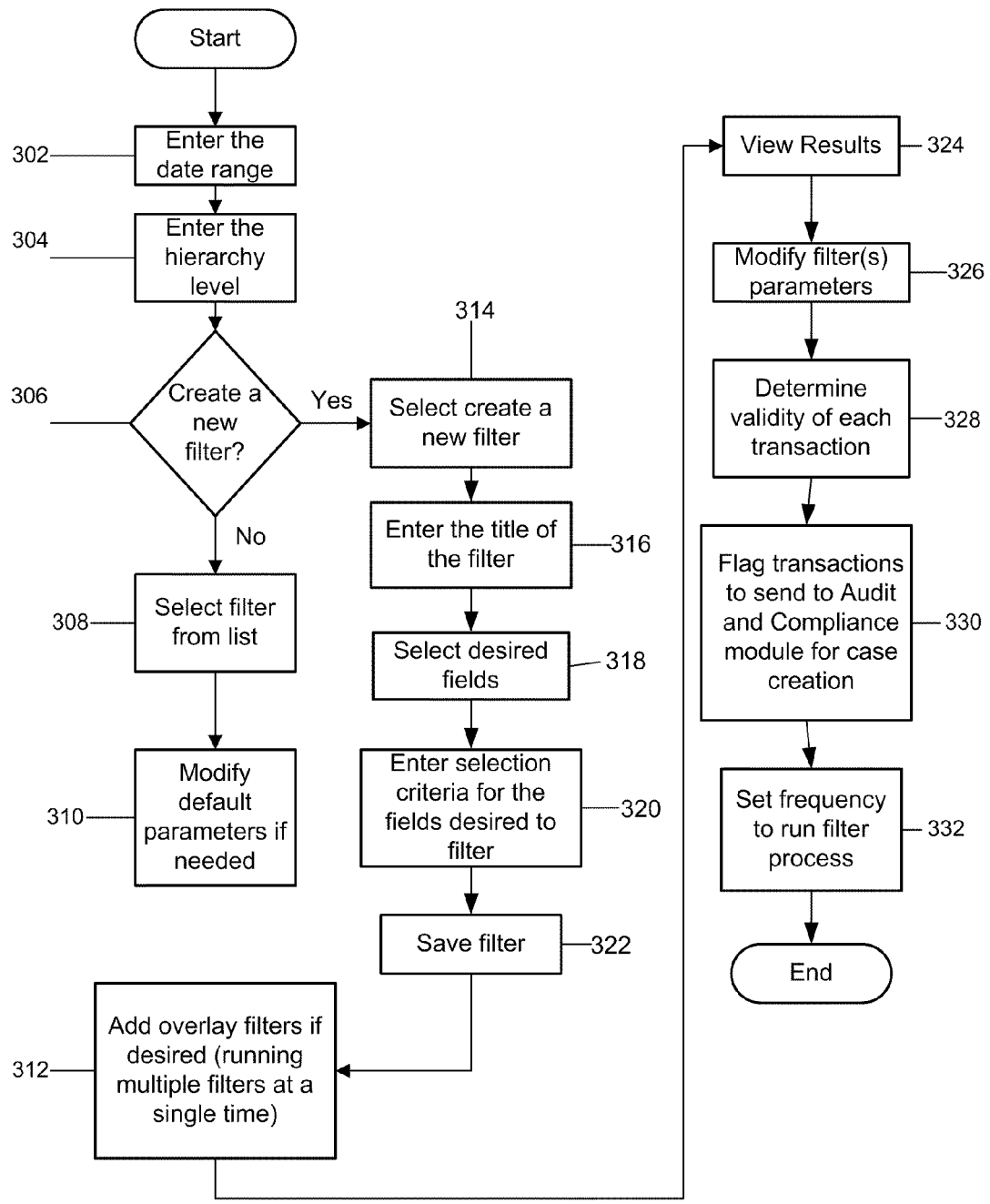
FIG. 3 is a flow diagram that illustrates the operations performed by the Filter/Business Rules processor of the analysis system illustrated in FIG. 1.

FIG. 3 shows a flowchart that illustrates the filter/rules processing for user specification of rules processing. At the flow diagram box numbered 302, a user of the data analysis system specifies a transaction time period over which the rule is to be applied. That is, the user enters a date range that specifies the dates of financial transactions to which the rule will be applied. Thus, the entered date range will be applied to the transaction date field of the transaction database. Next, at the box numbered 304, the user enters a hierarchy level. This level refers to an organization level. For example, the hierarchy may be used to apply rules based on corporate entity or division, or based on exempt or non-exempt status of a cardholder, or based on predefined organizational levels that are a function of the particular analysis system implementation. At box 306, users indicate if they are creating a new rule. If they are not, a negative outcome at box 306, then they can select an existing rule, such as via a drop-down box or listing of rules, at box 308. Users are given the opportunity to modify default rule parameters at box 310, and at box 312 users can specify application of overlay filters and combinations of rules using the join operands noted above. If a user wanted to create a new rule at box 306, an affirmative outcome, then the user is taken to a filter creation display (box 314). At box 316, the user is prompted for a rule name. At box 318 the user can select the desired fields, at box 320 the user can enter selection criteria for transactions that match the rule (i.e., field, comparison expression, test value combinations). The user saves the rule at box 322, for reuse. Processing then proceeds to box 312 to specify combinations of rules, if desired.

At box 324, the user can view results of the rule application. This provides the user with an opportunity to modify filter parameters, if desired (box 326). Filter modification is initiated by a forced return (through user interface command) to box 320 processing. If the viewed results are accepted, processing moves to box 328, where the user can determine validity of each transaction that was identified as matching the rule. At box 330, the user can indicate (flag) financial transactions that will be sent to the audit and compliance module for further processing. At box 332, the user can set the run frequency of the rule, as noted above.

Sampling Module

The sampling module 212 provides users with the capability to statistically sample their transactions based on industry accepted sampling plans. Users can customize sampling plan parameters to adjust the outcome so that the sampling aligns with the agency's desired sampling parameters and resource capacities. The sampling module operates on transactions that have already been authorized by the processing system 106 (FIG. 1) to identify transactions that are to be subjected to further processing, such as checking for business rules violations, that the transaction might not otherwise receive. In this way, the sampling module provides an agency with the ability to utilize an accounting audit best practice by statistically reviewing a portion of a transaction population and determine the likelihood of an undesirable occurrence that might indicate non-compliant activity. This sampling process, however, does not assure the agency of an acceptable level of data quality being transmitted and received from the merchants and processors. The quality level of the data entering the application is dependent upon what details are transmitted from the merchant and processor in the payment system 106 to the analysis system 108.

The sampling module can provide a process called "acceptance sampling." Acceptance sampling is a procedure used for determining if incoming batches or groups of transactions should be accepted or rejected. Each agency can define minor, major, and critical defects according to its tolerance level. Many organizations use military standards tables to develop acceptance and rejection criteria. The tables developed for acceptance and rejection levels will provide inspection plans for sampling by attributes for a given batch size and acceptable quality level (AQL). An inspection plan includes: the sample size (n), acceptance values (c), and the rejection values (r).

The sampling standard includes three types of inspection (normal, tightened, and reduced inspection). The type of inspection to be applied typically depends on the quality of the last group of transactions inspected. At the beginning of inspection, with no prior history, normal inspection is used. Tightened inspection (for a history of low quality transactions) may require a larger sample size than normal inspection. Reduced sampling (for a history of high quality) has a higher acceptance number relative to normal inspection (so it is easier to accept the batch or group of transactions). There are typically special switching rules between the three types of inspection, as well as a rule for discontinuation of inspection. One type of sampling paradigm that can be used is specified by U.S. government military standards, referred to as MIL-STD 105E and MIL-STD 1916, which will be known to those skilled in the art.

The sampling module can provide the functionality of selecting transactions from a cycle dataset after the filters/rules have been applied. The module can receive inputs with which the user can select/enter the desired confidence level and select/enter the sampling plan. The module user can define minor, major, critical defects. The sampling plan can select from the entire population of authorized transactions, or can be configured to select only from passed transactions (i.e., transactions that have been approved by the filters/rule processing). The sampling module process can be initiated by the user on a scheduled basis (e.g., daily, weekly, monthly, etc.) or as needed.

The sampling plan can be applied over any user defined historical or aggregated period of transactions by account or agency (e.g., view sampling parameters applied to transactions within a single day, week, month, year, etc.). The sampling module can also provide timely feedback on transactions, which will allow an agency to initiate a dispute process within a 60-day dispute period, if desired. The module can also randomly select the user specified number of transactions to avoid subjectivity.

Figure 7:
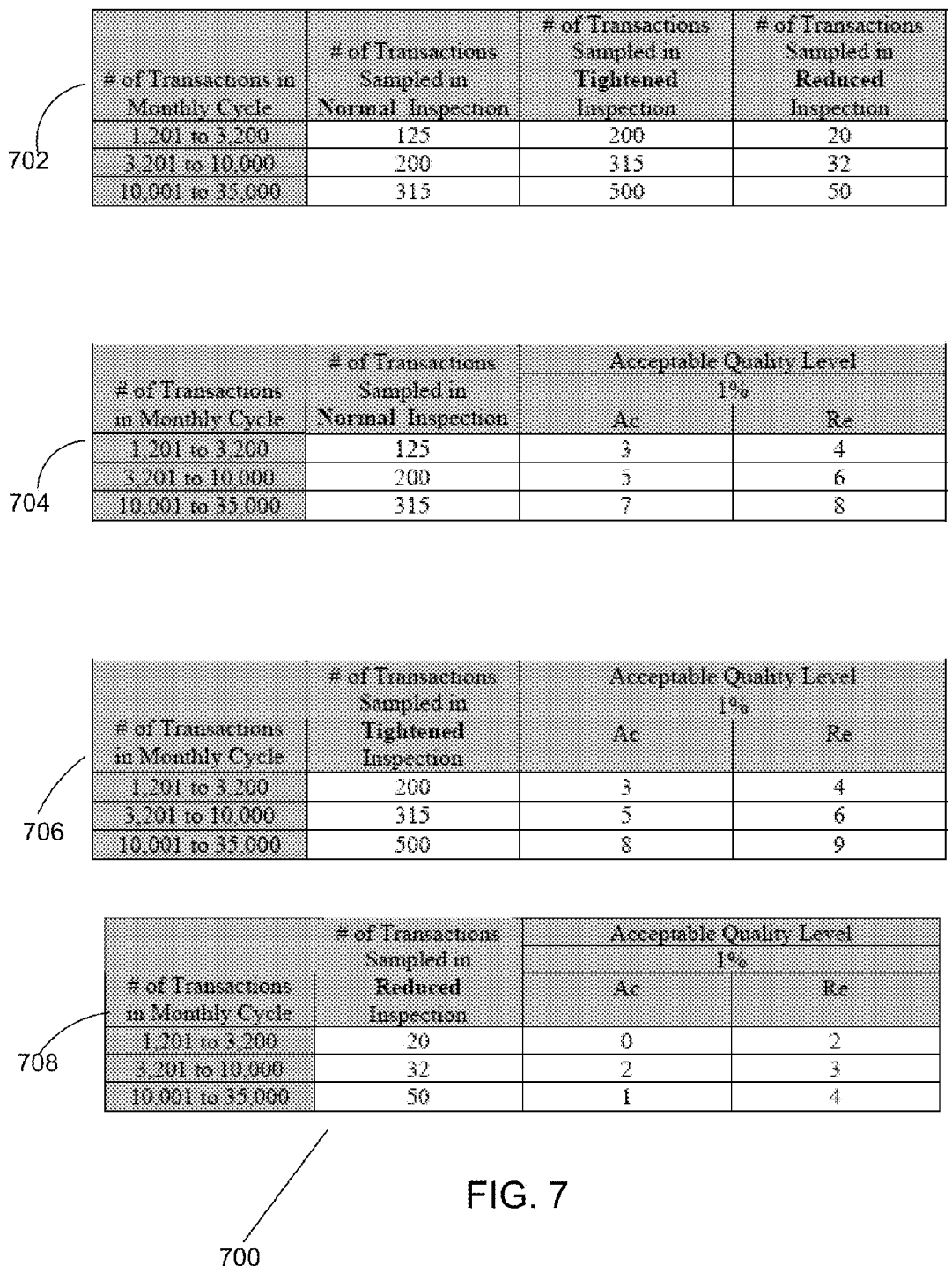
FIG. 7 shows sampling plan designs as received into the data analysis system through user input.

Exemplary sampling plan designs that can be received from user specification through the analysis system interface are illustrated in FIG. 7. The tables 700 illustrated in FIG. 7 are examples of user input screen displays at the analysis system 108 (FIG. 1) through which a user inputs data to define a sampling plan for execution in accordance with the invention. The top-most table display 702 shows parameters for normal inspection, tightened inspection, and reduced inspection. The next three, tables 704, 706, 708 show user input for specification of acceptable quality levels.

Exemplary operations associated with this module are listed in Table 6 below:

TABLE 6

Module Use Case:

| | |
|---|---|
| 1. | Log in to the application through portal front end. |
| 2. | View links to entitled modules. |
| 3. | Select sampling module. |
| 4. | Agency administrator user can select any one of the following options within the sampling module. |
| 4.1. | Enter the desired sampling plan specifications. Some default sample plans will be provided as a suggested option. |
| 4.2. | Set or modify the acceptable quality level (AQL). |
| 4.3. | Set the confidence level. |
| 4.4. | Select the time duration for sampling by entering a date range. |
| 4.5. | Select the number of transactions to be sampled after applying the sampling plan. |
| 4.6. | Establish transaction accept/reject criteria at AQL under normal, reduced and tightened inspection. |
| 4.7. | Define minor, major and critical defects for agency. |
| 4.8. | Run the sampling plan and view results. |
| 5. | User closes module. |

Figure 4:
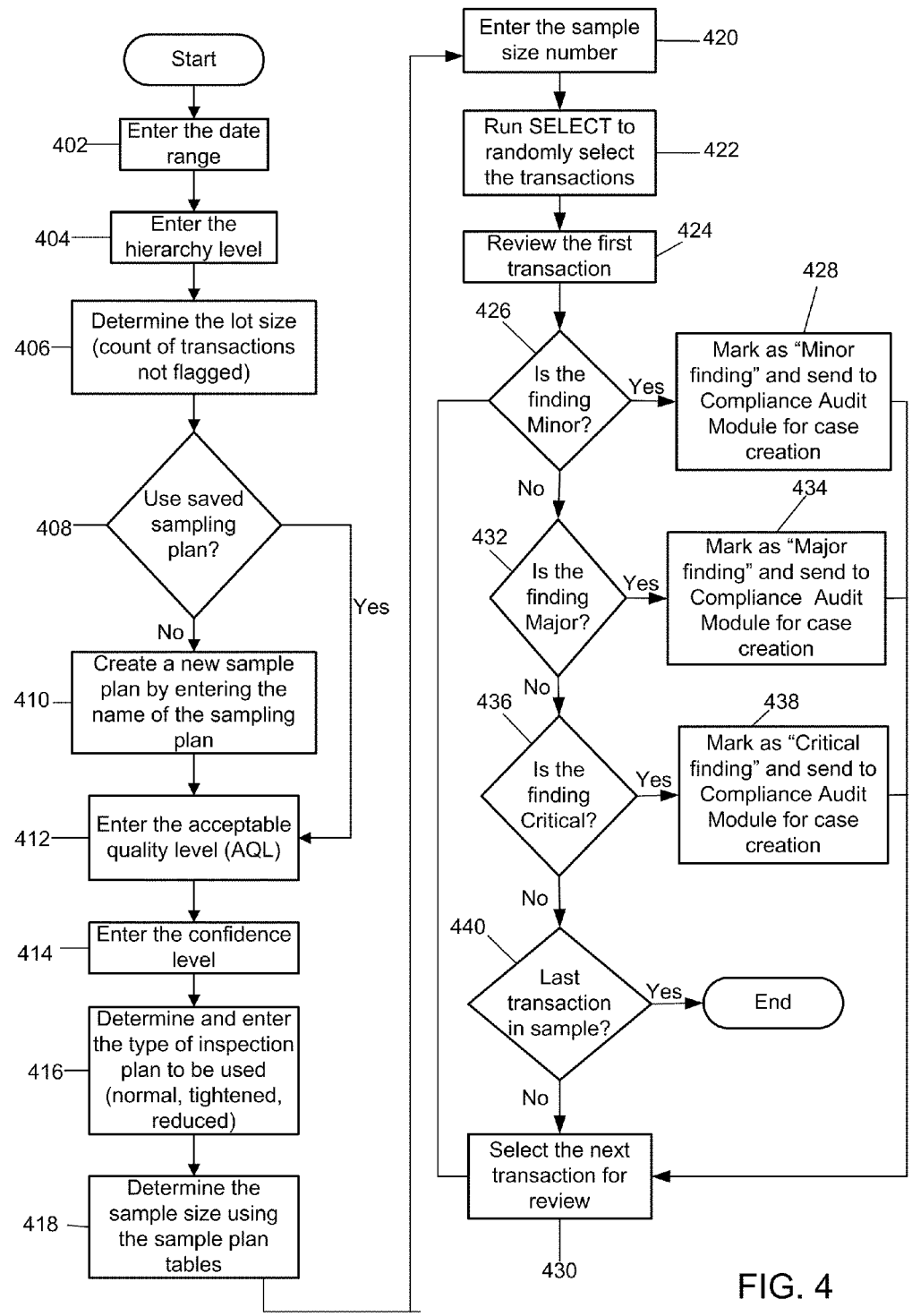
FIG. 4 is a flow diagram that illustrates the operations performed by the Sampling processor of the analysis system illustrated in FIG. 1.

FIG. 4 shows a flowchart the illustrates the sampling processing of the data analysis system and user specification of sampling operation. At box 402, a user enters a data range for application of the sampling plan. At box 404, as with the filter/rules module, the user next enters a hierarchy level for the processing. The user next enters a transaction lot size at box 406 (for exemplary values, see FIG. 7). Next, at box 408, if the user does not want to use a saved sampling plan, a negative outcome, then at box 410 the user creates a new sampling plan. If the user wants to use a saved plan, an affirmative outcome at box 408, then the user selects a sampling plan and at box 412 the user specifies an acceptable quality level (AQL) for the plan. At box 414, the user sets the confidence level. At box 416, the user determines the type of inspection plan to be used. For example, the user may select between normal, tightened, or reduced inspection. At box 418, the user determines the sample size to be used, according to sample plan tables. At box 420, the user determines the sample size number by selecting the number of transactions to be sampled after applying the sampling plan. Next, at box 422, the user initiates the sample processing. At box 424, the user receives the sampling results and reviews them. The user then specifies when a result is minor (box 426, 428) and proceeds to the next transaction (box 430), and continues to specify whether the result is major (box 432, 434) or critical (box 436, 438). At the last transaction, box 440, sampling processing is completed when the last sample has been processed.

Predictor Module

The predictor module can provide users with the capability to dynamically identify transactions that present the newest areas of risk and vulnerability to program operations. The predictor module operates on already-authorized transactions that have been approved by the processing system 106 (FIG. 1) to identify transactions that have characteristics that indicate a likely non-compliant transaction. There is some degree of cooperation between the modules, in that the rules module 210 identifies transactions as "flagged" transactions that comprise a rules violation and therefore require further checking for being possibly non-compliant, and such that flagged transactions can be checked by the compliance module 216. The sampling module 212 determines transactions that do not otherwise have characteristics that would indicate a non-compliant transaction but are selected for further checking nevertheless, in accordance with a sampling paradigm, such that the determined transactions also are checked further by the compliance module 216 for any characteristics that might indicate a non-compliant transaction. The predictor module 214 examines already-authorized transactions that have no known violation of program regulations (an example of a passed transaction) to determine if the transaction has characteristics that indicate potential regulations-avoidance behavior. The identified transactions can be checked by the compliance module 216 to identify any actual violations and non-compliant activity.

The predictor module 214 can provide the agency with a variety of methods to use for selecting at-risk transactions for further review. For example, the methods can comprise regression analysis, neural networks analysis, and genetic algorithms. Each method will provide a unique and advanced approach to selecting transactions for review. An exemplary description of each potential implementation is provided below.

Regression Analysis. The application will use regression analysis to measure the relationship of the data elements associated with a transaction set. When an outlier is detected, the transaction will be flagged for further review. The user can adjust the sensitivity of the process so that it aligns with the agency's tolerance levels and resource capacities.

Neural networks. A neural network models the degree of interconnection and the adaptive interaction between the data elements associated with a card transaction. Neural networks are capable of reviewing card transactions in ways similar to the approach used by a human mind. There are several different types of neural networks that can be incorporated into the application. Simple perceptrons, back propagation, and radial basis networks could be used. After sufficient training has occurred, the networks can adapt in a pure manner to the transaction inputs.

Genetic algorithms. The application can use genetic algorithms to review the transaction population and present transactions for consideration for further review. The genetic algorithm evolution starts from the transaction set and analyzes the fit of each transaction to the algorithm. Next, it can run mutated or combined scenarios to form new populations to determine if any anomalies exist in the transaction set. Again, based on user tolerance settings, the genetic algorithm can present transactions for consideration.

The predictor module 214 can be used with the filter/rules module 210 and the sampling module 212. While the filter/rules module 210 selects transactions with known criteria and the sampling module 212 provides some confidence that a set of transactions contains acceptable transactions, the predictor module 214 can actively analyze and present transactions having new and novel patterns that could be suspect.

Once a transaction is selected by the predictor module 214, it could be transferred to the compliance and audit module 216 (if that module is being used). The predictor module 214 is designed to fully interface with the compliance and audit module 216. In the compliance and audit module 216, the associated information will be used to establish a case that will facilitate tracking and managing further review of the transaction.

The predictor module 214 uses a learning model that analyzes and flags novel transactions for further review. Generally, the predictor module 214 can be utilized after applying business rules and statistically-valid sampling approaches. The module may use a variety of techniques to determine transactions that are determined to be worthy of further analysis. As noted, these techniques can include linear regression, neural networks, and genetic algorithms. The predictor module process can generally be initiated by the user on a scheduled basis (e.g., daily, weekly, monthly, etc.) or as needed. The predictor module process can be applied over any user defined historical or aggregated period of transactions by account or agency (e.g., view a predictor range applied to transactions within a single day, week, month, year, etc.). The predictor module can also provide timely feedback on transactions which will allow an agency to initiate the dispute process within a 60 day dispute period, and can provide results so that the program management can review selected transactions and determine if they are valid.

Exemplary operations associated with this module are listed in Table 7 below:

TABLE 7

Module Use Case:

1. Log in to the application through portal front end.
2. View links to entitled modules.
3. Select predictor module.
4. Agency administrator user can select any one of the following options within the predictor module.
4.1. Select learning module method to cluster/profile transactions.
4.2. Modify settings for each method offered.
4.3. Run and view results/impact of selected method.
5. User closes module.

Figure 5:
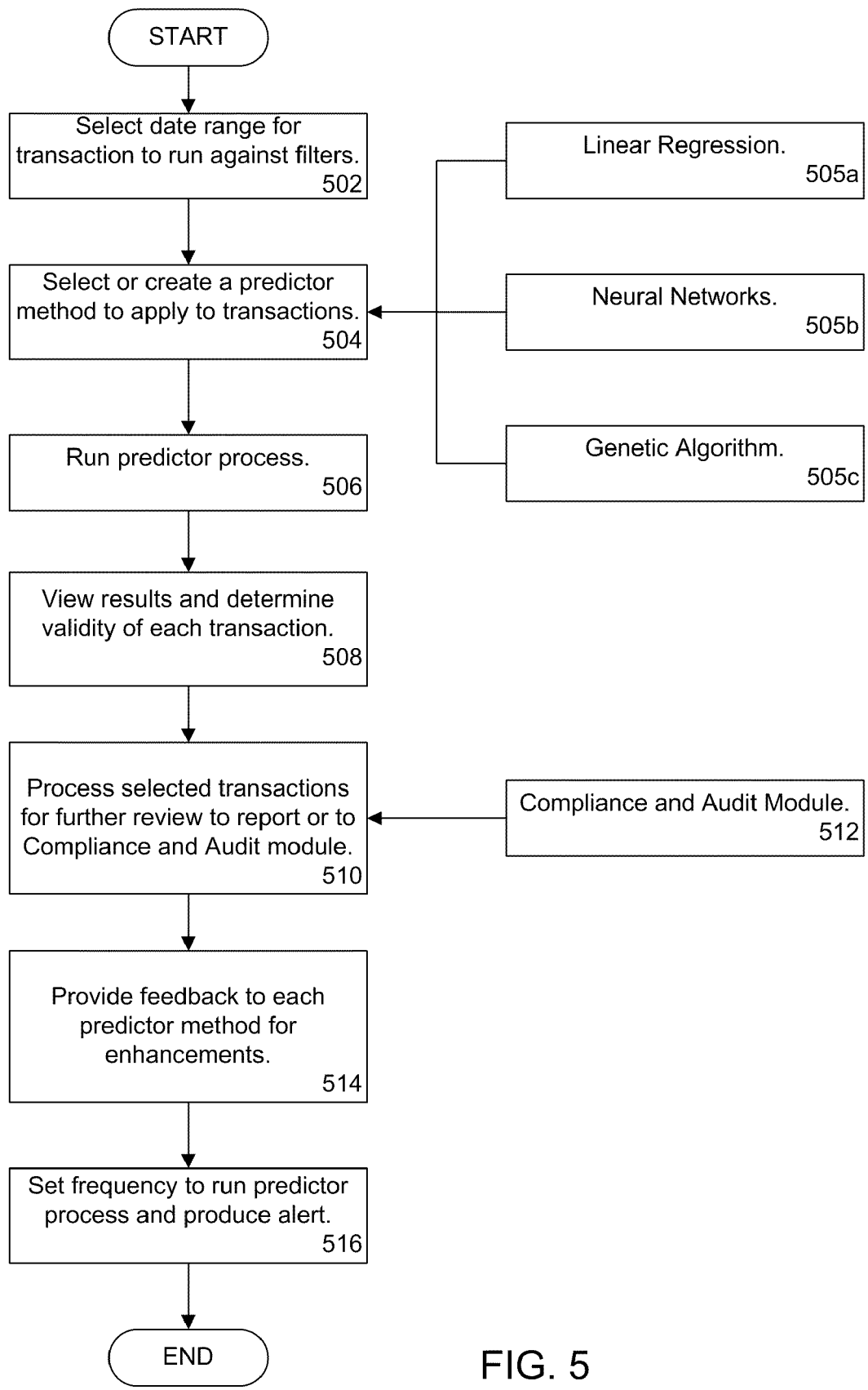
FIG. 5 is a flow diagram that illustrates the operations performed by the Predictor processor of the analysis system illustrated in FIG. 1.

FIG. 5 shows the general sequence of processing for the predictor module. Initially, at box 502, the user selects a date range for checking filter/rules violations against the financial transactions. At box 504, the user selects a predictor, or creates a new predictor, as noted above, to incorporate linear regression analysis 505a, neural network analysis 505b, or genetic algorithm analysis 505c. The predictor process is then executed by the analysis system at box 506 to identify transactions with characteristics that indicate potential non-compliant activity, such as apparent rules avoidance behavior. At box 508, the results are viewed by the user to determine the validity of each identified transaction. If the user confirms questionable validity at box 510, then the transaction is provided to the compliance and audit module at box 512 for further processing. The user can provide feedback relating to the analysis technique that was used, for future enhancements or selection of alternative techniques (box 514). Lastly, at box 516, the user can select a run frequency for the predictor module process and determine alert notifications.

Compliance and Audit Module

The compliance and audit module 216 can provide users with the ability to manage their case load of flagged transactions. This module can help automate the process of selecting, reviewing, and documenting the audit process around flagged transactions. The compliance and audit module can assist and provide guidance in implementing the appropriate controls to ensure compliance with agency rules, such as Federal laws, Federal and agency regulations, and for monitoring program effectiveness. One of the most time consuming tasks for a card program is the research that is performed to ensure that any risk management policies and practices established in the agency's charge card management plan are carried out effectively. For example, the U.S. Department of Defense ("DoD") is specifically seeking an automated process for each level of program participant to review selected transactions and document their justification and feedback for audit review. The compliance and audit module's integration with the filter/rules module, sampling module, and predictor module will allow each agency to be more effective and efficient with its review process. The OMB Circular A-125 and DoD provide requirements around policy compliance and transaction auditing.

The compliance and audit module provides full integration with the filters/rules module, the sampling module, and the predictor module. The compliance and audit module can be used by cardholders, approver and program management office, if authorized. The module also provides case management capabilities and allows selected transactions to be routed to the proper users for review. It also can present several questions requesting user input to determine validity of the transaction, and it can provide comprehensive case tracking to maintain an extensive variety of information associated with a case (flagged transaction).

Exemplary operations which can be used by this module are listed in Table 8 below:

TABLE 8

Module Use Case:

1. Log in to the application through portal front end.
2. View links to entitled modules.
3. Select compliance and audit module.
4. Agency administrator user can select any one of the following options within the compliance and audit module.
4.1. Create, update, view a case.
4.2. Review filters/rules module, sampling module and predictor module flagged transaction results.
5. User closes module.

Figure 6:
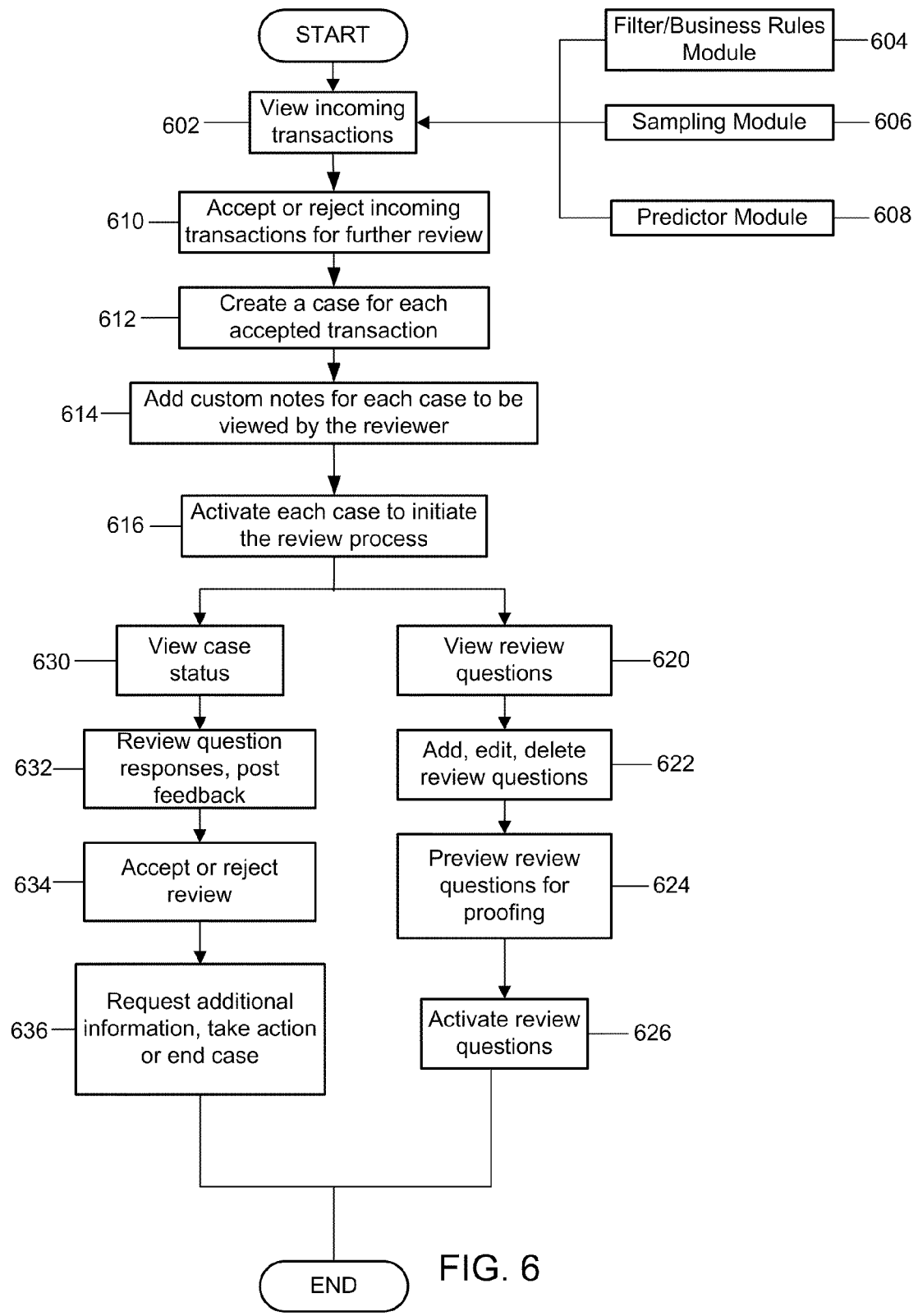
FIG. 6 is a flow diagram that illustrates the operations performed by the Compliance and Audit processor of the analysis system illustrated in FIG. 1.

FIG. 6 shows the general sequence of processing for the compliance and audit module operation. Initially, at box 602, the user will view a transaction that has been received into the compliance and audit module. Each transaction received into the compliance and audit module is received because of a processing decision at the filter/rules module 604, or the sampling module 606, or the predictor module 608. That is, the compliance and audit module receives flagged transactions for further review. Each transaction received by the compliance and audit module will typically be associated with a review question or issue or other characteristic that will have been noted by the referring module. At box 610, the module processing either accepts or rejects the received transaction for further review. A rejected transaction is a transaction that has been determined by the user to not require further review, and processing of that transaction in the compliance and audit module is completed upon rejection. For each accepted transaction, at box 612 a case number is created. Notes for the review can be added at box 614. The case is activated at box 616 to initiate the review process. The activation decision may be performed, for example, by an initial reviewer or by the same user who made the acceptance decision.

Upon activation of the case, a series of processing operations can be performed, including review of the questions related to the accepted case and review of the case status. In general, such review involves subjective determinations by authorized reviewers. At box 620, a reviewer checks review questions such as the questions or issues that resulted in referral to the compliance and audit module. At box 622, the reviewer is free to add, edit, or delete review questions and at box 624 the review questions are checked and then at box 626 the review questions for the case are activated for further processing by another person. Alternatively, if no further questions remain after the further review at 626, an authorized reviewer may terminate the processing.

The further processing may include review by a designated review person who checks the case status for processing (box 630). The reviewer then checks responses from prior questions or initiatives and provides feedback (632), accepts or rejects the further review (634), and can request additional information for more review, or take an action such as disallow the transaction or suggest transaction procedure changes, or end the case review (box 636).

Optimization Module

The optimization module 218 provides users with the ability to perform a program optimization review. This review can provide a card agency unit, such as a Program Management Office, with an overview of their program compared to industry standard key operating metrics. The optimization process through the optimization module is designed to evaluate existing practices of the agency's card program, identify targets of opportunity to leverage card program efficiencies, and offer suggestions to strengthen controls and attain best practice processes and procedures. This process can use an expert system to analyze card transaction data to identify potential areas of opportunity for increasing card transaction volume.

Some of the outcomes of the optimization process are to understand an agency's procurement spend patterns and identify purchase card expansion targets. The process is aimed at identifying "quick hit" (1-3 months) and longer term (3+ months) savings opportunities specific to the card agency. Some program specific feedback points could include, but are not limited to, total spend and count of transactions by payment method, top suppliers by spend, count of transactions and payment method, total spend, count of transactions and payment method by business unit and card program opportunities by transactions and spend based on issuer acceptance among the suppliers. The overall optimization process can be used to quantify benefits (e.g., process cost savings, rebates, etc.) associated with moving transactions from checks and paper purchase orders to purchase cards.

The optimization module provides card program analysis based on user inputs. The module also can support tracking of peer program key metrics (e.g., programs of similar spend, employee count, total operating budget, etc.) and updating the benchmark data as programs complete optimization efforts. The module can be used to identify program vulnerabilities and growth opportunities for risk management, can be used for review of non-payroll accounts payable data to provide a specific list of expansion opportunities, evaluate card performance to benchmark the card program against best practice peer programs, and identify best practices to reveal opportunities to enhance card program performance.

Exemplary operations associated with this module are listed in Table 9 below:

TABLE 9

Module Use Case:

1. Log in to the application through portal front end.
2. View links to entitled modules.
3. Select optimization module.
4. Agency administrator user can select any one of the following options within the optimization module.
4.1. Run and view results of a non-payroll accounts payable analysis.
4.2. Run and view results of a card program analysis.
4.3. Review an agency specific best practices "report card" that provides suggestions for enhancing their program.
5. User closes module.

Strategic Sourcing Module

The strategic sourcing module 220 will provide card programs with the ability to review organizational spend patterns. By understanding the spend patterns, an organization can better utilize its buying power to leverage better pricing with high volume vendors. For example, the U.S. federal government spends billions of dollars on goods and services each year, and federal agencies are responsible for maximizing the value of each dollar spent. Therefore, agencies are required to leverage spending to the maximum extent possible through strategic sourcing. Strategic sourcing is the collaborative and structured process of critically analyzing an organization's spending and using this information to make business decisions about acquiring commodities and services more effectively and efficiently. This process helps agencies optimize performance, minimize price, increase achievement of socio-economic acquisition goals, evaluate total life cycle management costs, improve vendor access to business opportunities, and otherwise increase the value of each dollar spent.

Purchase card program managers can better perform their management function if they are aware of any agency-wide or multi-agency wide contracts that can yield better pricing and ensure that cardholders are aware of agency policies for using these contracts. For example, agencies can minimize the number of small orders from schedule contracts and consider a more strategic approach to buying certain commodities. With respect to government programs, the program coordinator can review purchase card spend data and can make recommendations to the Chief Acquisition Officer to improve the buying process and increase savings based on volume. This module will facilitate the tasks required by each in fulfilling their outlined strategic sourcing responsibilities.

The strategic sourcing module provides functionality including the ability for a user to upload a data file with accounts payable transactions and provides an accounts payable analysis. The module provides strategic sourcing capabilities through reports grouped by business unit, merchant, commodity, and the like. The module is capable of meeting or exceeding minimum Federal sourcing requirements. The module can allow integration of databases, such as merchant profile databases, for analysis of financial transactions. The module also can deliver a thorough spend analysis, including contract data, delivery order data, and purchase card data. In addition, the module can integrate socio-economic data for analysis of agency goals and prioritized objectives, such as demographic information. It also provides performance measures to assess progress toward achieving agency strategic sourcing goals. The module functionality also permits saving agency analysis results to be used as a comparison point for future analysis.

Exemplary operations associated with this module are listed in Table 10 below:

TABLE 10

Module Use Case:

1. Log in to the application through portal front end.
2. View links to entitled modules.
3. Select strategic sourcing module.
4. Agency administrator user can select any one of the following options within the strategic sourcing module.
4.1. Select imported account payable non-payroll data for use in the analysis.
4.2. Select card program data for use in the analysis.
4.3. Create, edit, and save a data file that can be submitted for processing. This file could be submitted to a card agency for processing using a merchant profile database or be used by a third party provider to provide socio-economic data about suppliers.
4.4. Run a spend analysis using the application available data.
4.5. Create agency key performance metrics list with associated goals/targets
4.6. Run and view the agency key performance measures report.
5. User closes module.

Program Management Module

The program management module can provide the user the ability to review, reconcile, assign funding, and approve transactions for posting the local financial system. This module can also be used to present electronic statements to cardholders in an effort to facilitate timely delivery. Using the module, the card agency can identify and assign roles and responsibilities for each of the agency key management officials. These officials will likely include, but are not limited to, Agency/Organization Program Coordinator (A/OPC) persons, Approving officials or other equivalent officials, and other accountable/billing officials. This module can also be used to assist the program management office in facilitating the workflow process for establishing a process for formal appointment of cardholders and approving officials. A user can also have the ability to establish the appropriate authorization controls for each account within the program. For example, transactions limits, cycle limits, velocity limit and merchant category code restrictions. Another feature of this module that can be useful to the program management office is the recovery process for cards and other documentation when employees terminate employment, and in the case where an employee moves to a different organization.

The module can provide the functionality of account management, such as providing card program administrators with the ability to perform card account maintenance, create and manage commercial card accounts, and respond to cardholder needs in real time. The program management module also provides transaction management functionality, providing cardholders, approvers, and program administrators with transaction viewing, the ability to split costs, perform transaction allocation editing, adding additional detail to the transaction (equivalent to level III information), perform approval workflow, record out-of-pocket expenses, and attach scanned receipts to records. The module also provides statement management functionality, enabling cardholders, their managers, and program administrators to receive and view statements. Account summaries and activity posted since the most recent statement cycle are displayed in real time, so users know exactly what has been spent on a daily basis.

Exemplary operations that are associated with this module are mentioned in Table 11 below:

TABLE 11

Module Use Case:

1. Log in to the application through portal front end.
2. View links to entitled modules.
3. Select program management module.
4. Agency administrator user can select any one of the following options within the program management module.
4.1. Setup new cardholders.
4.2. Perform card account maintenance.
4.3. Perform maintenance on accounts.
4.4. View, edit, allocate and approve transactions.
4.5. Establish the transaction approval workflow.
4.6. View and approve a statement
4.7. Mark a transaction to included in a dispute report (This is for tracking in the application and is a manual process for marking and clearing the mark). This does not initiate the actual dispute process as defined by the card provider).
5. User closes module.

Training Module

The training module provides training around all aspects of the card program under which the analysis system is used. The module is designed to facilitate the development, delivery, testing, and certification of the card program participants. For example, the Training module is intended to help meet the outlined OMB Circular A-123, Appendix B training requirements for a public sector card program. Although the application may not provide the entire scope of the training process, the application can still likely serve as the hub for tracking and reporting each participant training requirements and history.

Some of the likely training scenarios for the module include training for purchase card cardholders on how to use a charge card. For example, for federal participants, there are procurement laws and regulations, agency policies, and proper card use with which users must comply. Training requirements must be consistent with the level of responsibility or spending authority the cardholder will have.

The training module provides functionality of providing document management for training material, providing the ability to present on-line training material with test, audio, and video capabilities, and tracking user training progress and certification against program requirements for new cardholder training and refresher cardholder training. The module can also be used to provide users with application-specific topical and reference help features and functionality.

Exemplary operations associated with this module are listed in Table 12 below:

TABLE 12

Module Use Case:

| | |
|---|---|
| 1. | Log in to the application through portal front end. |
| 2. | View links to entitled modules. |
| 3. | Select training module. |
| 4. | Agency administrator user can select any one of the following options within the training module. |
| 4.1. | Create slide style training material delivered via the web. |
| 4.2. | Attach an audio or video file to supplement the slide style training material. |
| 4.3. | Design and develop test questions and the associated scoring scale for program participants. |
| 4.4. | Deliver a training certificate to the user upon successful completion of the test. |
| 4.5. | Run reports on program participants and their training progress for new cardholders and current program participants. |
| 4.5.1. | Historical test status and scores for new and refresher training. |
| 4.5.2. | Last certification date. |
| 4.6. | Search the application help files. |
| 4.6.1. | Context functionality. |
| 4.6.2. | Index functionality. |
| 4.6.3. | Search functionality. |
| 5. | User closes module. |

In embodiments of the invention, a "server computer" may be used in one or more of the components shown in FIG. 1. A "server computer" may include a powerful computer or cluster of computers that behaves as a single computer which services the requests of one or more client computers. The server computer can be a mainframe computer, a minicomputer, or a minicomputer cluster. For example, the server computer may include one or more database servers and one or more Web servers.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components, modules, or functions described in this application may be implemented as software code to be executed by a computer processor using any suitable computer language such as, for example, Java, C++, Visual Basic, or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

A recitation of "a", "an" or "the" is intended to mean "one or more" unless specifically indicated to the contrary.

We claim:

1. A method of processing financial transaction data of a payment program, the method comprising:
  receiving data relating to a set of financial transactions that have been authorized by a payment processing system in accordance with the payment program;
  determining if one or more of the authorized financial transactions will be subjected to further processing, wherein the further processing comprises operations of an analysis system on the received data and identifies authorized financial transactions that may comprise misuse or abuse of the payment program or may be out of compliance with transaction regulations of the payment program;
  wherein determining comprises
    receiving a user defined range of transactions over which the further processing is applied and producing results in accordance with the user defined range,
    performing sampling on passed transactions to designate one or more of the passed transactions as flagged transactions to be checked for violation of one or more business rules, and
    receiving a flagged transaction at an audit module of the analysis system, wherein the received flagged transaction is associated with a review issue noted by the analysis system that deemed the financial transaction a flagged transaction,
  wherein the audit module assigns a case number to the received flagged transaction in response to acceptance of the flagged transaction for further processing, and the audit module otherwise terminates processing of the flagged transaction;
  wherein the sampling is performed by a sampling module of the analysis system according to a selected sampling plan and a selected inspection level such that a financial transaction selected according to the sampling plan and inspection level is deemed a flagged transaction for further review.

2. The method as defined in claim 1, wherein acceptance of the flagged transaction comprises acceptance by a reviewer of the flagged transaction.

3. The method as defined in claim 1, wherein determining further comprises performing prediction processing on the set of authorized transactions in a predictor module of the analysis system that identifies transactions with characteristics that indicate potential non-compliant activity for review by a user to be deemed a flagged transaction for further review.

4. The method as defined in claim 3, wherein the prediction processing utilizes regression analysis.

5. The method as defined in claim 3, wherein the prediction processing utilizes neural network analysis.

6. The method as defined in claim 3, wherein the prediction processing utilizes genetic algorithm analysis.

7. The method as defined by claim 1, wherein determining further comprises comparing business rules criteria against the received data in a business rules module of the analysis system for one of the financial transactions according to the one or more business rules such that the one financial transaction is deemed a flagged transaction for further review in response to a match of the business rules criteria to the received data, and wherein the one or more business rules are user-defined.

8. A system for processing financial transactions data, the system comprising:
a management processor for receiving data relating to a set of financial transactions that have been authorized by a payment processing system of a payment program in accordance with the payment program;
an analysis system that determines if one or more of the authorized financial transactions will be subjected to further processing, wherein the further processing operates on the received data and identifies authorized financial transactions that may comprise misuse or abuse of the payment program or may be out of compliance with transaction regulations of the payment program;
wherein the analysis system receives a user defined range of transactions over which the further processing is applied and produces results in accordance with the user defined range; and
wherein the analysis system further comprises
a sampling module that perform sampling on passed transactions to designate one or more of the passed transactions as flagged transactions to be checked for violation of one or more business rules, and
an audit module that receives a flagged transaction, wherein the received flagged transaction is associated with a review issue noted by the analysis system that deemed the financial transaction a flagged transaction,
wherein the audit module assigns a case number to the received flagged transaction in response to acceptance of the flagged transaction for further processing, and the audit module otherwise terminates processing of the flagged transaction;
wherein the sampling is performed by a sampling module of the analysis system according to a selected sampling plan and a selected inspection level such that a financial transaction selected according to the sampling plan and inspection level is deemed a flagged transaction for further review.

9. The system as defined in claim 8, wherein acceptance of the flagged transaction comprises acceptance by a reviewer of the flagged transaction.

10. The system as defined in claim 8, wherein determining further comprises performing prediction processing on the set of authorized transactions in a predictor module of the analysis system that identifies transactions with characteristics that indicate potential non-compliant activity for review by a user to be deemed a flagged transaction for further review.

11. The system as defined in claim 10, wherein the prediction processing utilizes regression analysis.

12. The system as defined in claim 10, wherein the prediction processing utilizes neural network analysis.

13. The system as defined in claim 10, wherein the prediction processing utilizes genetic algorithm analysis.

14. The system as defined in claim 8, wherein determining further comprises comparing business rules criteria against the received data in a business rules module of the analysis system for one of the financial transactions according to the one or more business rules such that the one financial transaction is deemed a flagged transaction for further review in response to a match of the business rules criteria to the received data, and wherein the one or more business rules are user-defined.

15. A program product for use in a computer system that executes program instructions recorded in a computer-readable media to perform a method for processing financial transactions data, the program product comprising:
a recordable media;
a program of computer-readable instructions executable by the computer system to perform operations comprising:
receiving data relating to a set of financial transactions that have been authorized by a payment processing system in accordance with a payment program;
determining if one or more of the authorized financial transactions will be subjected to further processing, wherein the further processing comprises operations of an analysis system on the received data and identifies authorized financial transactions that may comprise misuse or abuse of the payment program or may be out of compliance with transaction regulations of the payment program;
wherein determining comprises
receiving a user defined range of transactions over which the further processing is applied and producing results in accordance with the user defined range,
performing sampling on passed transactions to designate one or more of the passed transactions as flagged transactions to be checked for violation of one or more business rules, and
receiving a flagged transaction at an audit module of the analysis system, wherein the received flagged transaction is associated with a review issue noted by the analysis system that deemed the financial transaction a flagged transaction,
wherein the audit module assigns a case number to the received flagged transaction in response to acceptance of the flagged transaction for further processing, and the audit module otherwise terminates processing of the flagged transaction;
wherein the sampling is performed by a sampling module of the analysis system according to a selected sampling plan and a selected inspection level such that a financial transaction selected according to the sampling plan and inspection level is deemed a flagged transaction for further review.

16. The program product as defined in claim 15, wherein acceptance of the flagged transaction comprises acceptance by a reviewer of the flagged transaction.

17. The program product as defined in claim 15, wherein determining further comprises performing prediction processing on the set of authorized transactions in a predictor module of the analysis system that identifies transactions with characteristics that indicate potential non-compliant activity for review by a user to be deemed a flagged transaction for further review.

18. The program product as defined in claim 17, wherein the prediction processing utilizes regression analysis.

19. The program product as defined in claim 17, wherein the prediction processing utilizes neural network analysis.

20. The program product as defined in claim 17, wherein the prediction processing utilizes genetic algorithm analysis.

21. The program product as defined in claim 15, wherein determining further comprises comparing business rules criteria against the received data in a business rules module of the analysis system for one of the financial transactions according to the one or more business rules such that the one financial transaction is deemed a flagged transaction for further review in response to a match of the business rules criteria to the received data, and wherein the one or more business rules are user-defined.

* * * * *